United States Patent Office 3,402,720
Patented Sept. 24, 1968

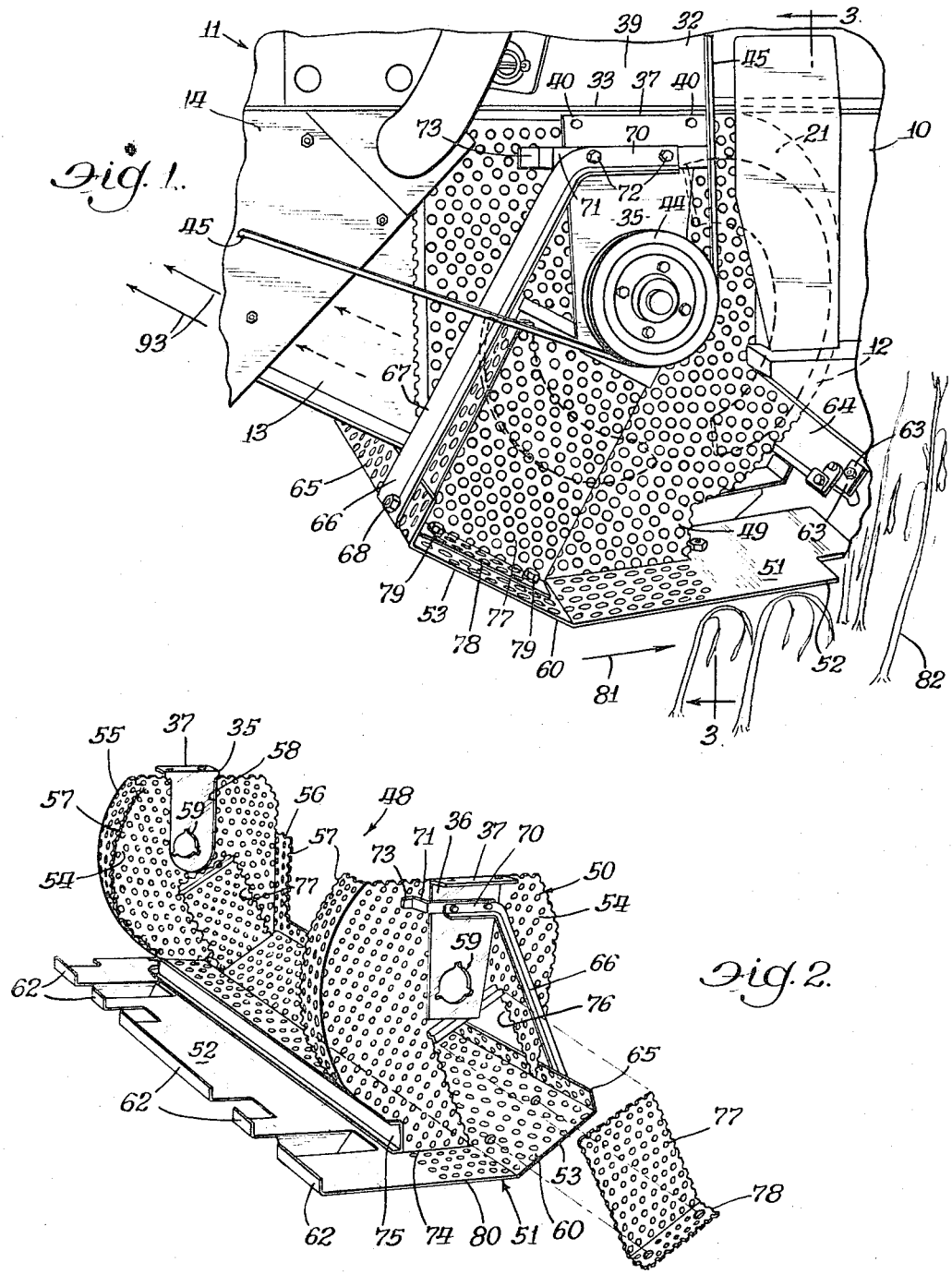

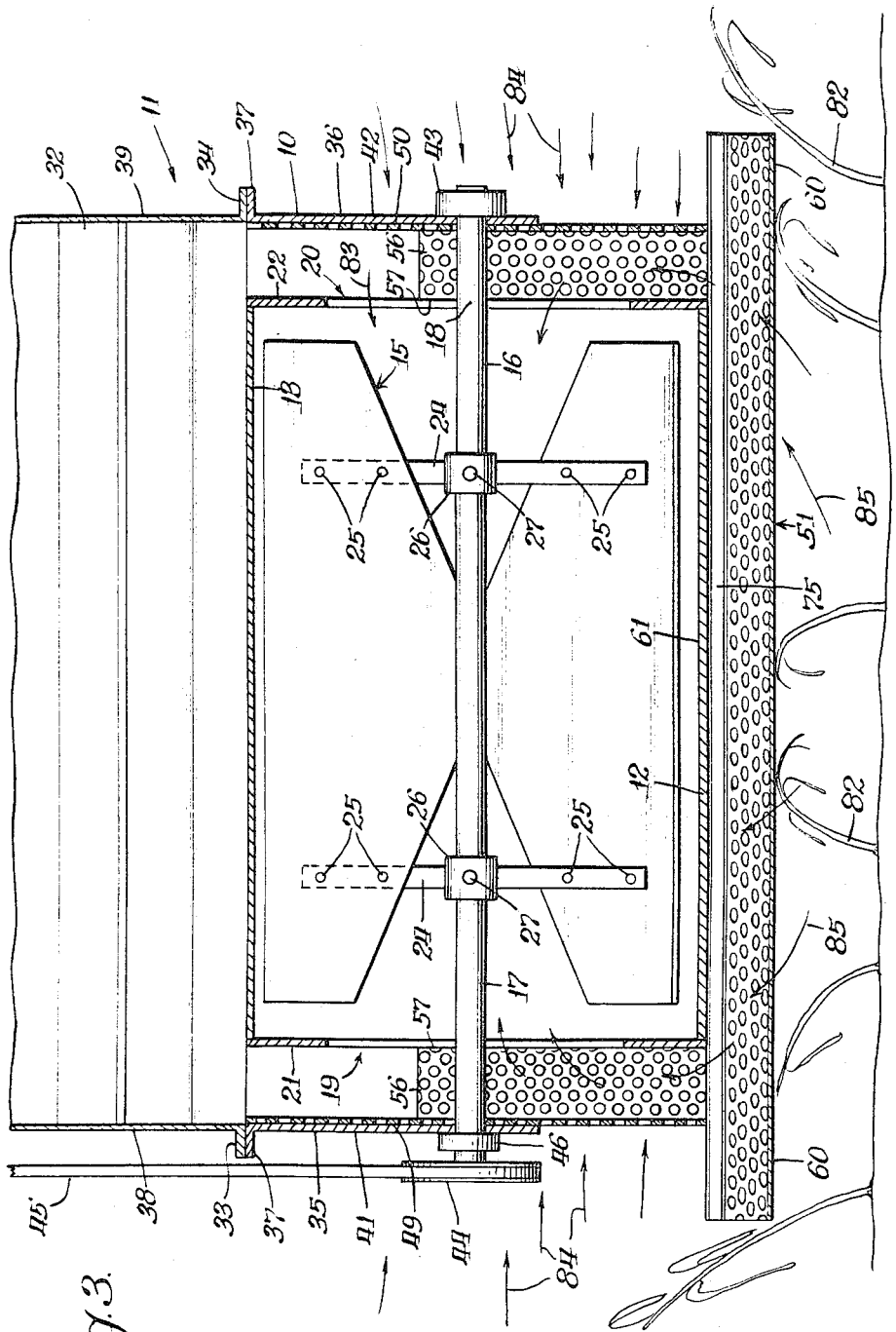

3,402,720
FAN SCREEN CONSTRUCTION FOR COMBINES
Edward W. Rowland-Hill, Bettendorf, Iowa, assignor to International Harvester Company, Chicago, Ill., a corporation of Delaware
Filed Aug. 6, 1965, Ser. No. 477,723
7 Claims. (Cl. 130—27)

ABSTRACT OF THE DISCLOSURE

A screen-shield for the fan of a combine, having a forward portion made of solid sheet material and situated to encounter the field crop beneath the combine, the remainder of said screen-shield being made of perforated sheet material for permitting the free passage of air. The screen-shield is spaced from the fan casing so there is an air cavity therebetween which can be supplied with air through any portion of the screen-shield.

---

The instant invention relates to combines. Particularly the invention relates to a screen construction for combine fans.

Combines for harvesting grain crops conventionally have a header structure for aggressively engaging and severing crop disposed in a harvesting path. The header structure is adapted to convey thusly severed crop upwardly through what is characterized as a feed box by means of elevators to a station where the crop is treated for initial separation of the grain from its other vegetation. The separation of the grain is variously referred to, depending upon the nature of the crop, either as threshing or, as in the case of corn, shelling.

The mechanism employed for initial grain separation comprises a rotatable cylinder which carries a plurality of circumferentially spaced rasp bars. The rasp bars, upon rotation, abrade the grain from crop by rubbing the vegetation against a structure concentric with the cylinder and referred to as a concave, the perforated floor of which is adapted to pass the separated grain toward a collection station while retaining for ejection in another direction the nonpassed material.

Not all of the grain is separated by initial cylinder treatment. Accordingly, vegetation not passed by a concave will be retreated by agitation upon oscillating foraminous means adapted to pass grain toward a collection station and retain the other vegetation for ejection from the combine as waste.

Grain separated in the aforedescribed manner invariably contains undesirable material such as chaff or other debris which is removed by air currents produced by a blower fan. The blower fan of a combine is conventionally mounted at the bottom part of the combine body below the initial grain separating station and disposed to direct its air currents upwardly through the various courses over which grain moves in the combine to blow nongrain vegetation away from the grain. Characteristically, a blower fan is mounted in a housing and has a fan shaft driven from the prime mover means of the combine. The fan has a pair of air intake openings in which there may be mounted adjustable shutters for controlling air volume according to crop conditions.

A conventional combine fan tends to draw foliage into its air intake openings. To obviate contamination of grain by foliage drawn into a combine fan, several designs of foraminous or perforated screens have become conventional in the art. While precluding contamination of the grain, conventional screens are constructed in such a fashion that they become clogged by the foliage which they are adapted to block from entry into fan housings. Thereby, such screens render operation of the combine inefficient because, when clogged, they shut off the air flow for production of grain cleaning currents. Under such circumstances, attention to manually unclog or unblock the screen to permit sufficient flow of air to clean the grain is required. Alternatively, when conventional screens are not cleaned frequently, poor samples may result, that is, grain having a high quantity of nongrain material. The likelihood of such occurrence is especially great when harvesting high moisture corn, the stalks of which have much foliage attached.

In accordance with the instant invention, and as the principal object thereof, there is provided an improved screen construction for combine fans for obviating the aforestated problem.

It is an additional object of the instant invention to provide a combination fan screen construction and fan housing guard or shield, with a view to precluding injury to the fan housing.

It is a further object of the instant invention to provide a fan screen construction for combine blower fans which is adapted for mounting on conventional equipment.

Another object of the instant invention is the provision of a screen construction for combine blower fans, said screen construction having an enlarged area through which air is drawn into the fan housing and adapted to be swept clean by the vegetation over which the combine moves in a harvesting path.

A yet further object of the instant invention is the provision of a perforate screen for a blower fan housing of a combine, which screen is spaced from the fan housing and defines thereabout a multiported air chamber into which air is drawn for the blower fan.

Still a further object of the instant invention is the provision in a fan housing screen of the class described of a pair of parallel side screen members spaced outwardly from the normal air intake openings of the fan housing, and a bottom screen member with said parallel side screen members forming a housing adapted for disposition about a blower fan housing, said bottom screen member adapted to be kept free of debris by the sweeping action of vegetation over which said bottom screen member moves, to insure a continuous flow of air into the fan housing.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a side perspective of that part of a combine in which its blower fan is disposed, one embodiment of the invention shown mounted with respect to the housing of said fan, parts being shown dotted for the purpose of illustration.

FIG. 2 is a partially exploded perspective view of said embodiment showing the same dismounted and looking toward the side opposite that shown in FIG. 1.

FIG. 3 is a horizontal sectional view taken on the line 3—3 of FIG. 1 and looking in the direction of the arrows.

Referring to FIGS. 1 and 3, therein there is shown a forward end portion 10 of a combine body generally designated by numeral 11. The forward end portion 10 defines a fan housing 12, shown dotted in FIG. 1, and having a generally cylindrical part the axis of which extends transversely of the longitudinal axis of the combine 11 the lower part of which said fan housing comprises. The combine body part 14 which extends rearwardly of the fan housing 12 defines a passage 13 for directing air currents generated in fan housing 12 in the direction of arrows 93 toward apparatus (not shown) which may be conventional for blowing nongrain vegetation from the harvested grain or seed.

As illustrated in FIG. 3, there is disposed within the fan housing 12 a fan rotor, generally designated 15 and which in the instant embodiment of the invention comprises a fan shaft 16 the opposite end portions 17 and 18 of which are projected through opposite fan housing side openings 19 and 20, respectively. The housing side openings 19 and 20 are defined by annular flat plates 21 and 22, respectively, which comprise the opposite sides of combine body 11 and through which air is drawn in the direction of arrows 83 into the interior of the fan housing, the fabric of which is imperforate, being sheet metal or the like.

The rotor 15 comprises a plurality of elongated impeller vanes or paddles 23 which extend longitudinally of the rotor shaft 16 and which are projected radially from said shaft in a conventional manner. Said impeller vanes 23 are mounted to rotate with the rotor shaft 16, such mounting, in the instant embodiment, being by means of a plurality of elongated straps or ties 24 having outer end portions which are secured to diametrically disposed pairs of vanes 23 by means of suitable fasteners 25, such as rivets or the like. Medial or central parts of the ties 24 are secured to a pair of collars 26 which are spaced longitudinally of the shaft 16 and secured thereto by means of suitable fasteners 97 such as set screws or the like. Accordingly, as the shaft 16 rotates, the air is drawn into the fan housing through openings 19 and 20, and air currents generated by impeller vanes 23 are blown outwardly from fan housing 12 through the passage 13.

As illustrated in FIGS. 1 and 3, the forward body portion 10 of the combine 11 comprises a sloping feeder box 32 which is defined by a pair of opposite side walls 38 and 39. Side walls 38 and 39 are disposed above the fan housing 12 and spaced outwardly from the opposite fan housing side walls 21 and 22. The upper side walls 38 and 39 have a pair of opposed laterally extending flanges 33 and 34, respectively.

A pair of fan shaft brackets 35 and 36 are connected to said flanges 33 and 34 in alignment axially of shaft 16. To support said fan shaft brackets, they have laterally extending flanges 37 which are rigidly secured to flanges 33 and 34 by means of suitable fasteners which may include bolts 40, as illustrated in FIG. 1. The brackets 35 and 36 have normally depending flanges 41 and 42 integral with respective of flanges 37, said flanges 41 and 42 being spaced laterally from side walls 21 and 22, respectively, and having projected therethrough and outwardly therefrom opposite end portions 17 and 18 of shaft 16.

A bearing block 43, which is suitably connected on the outer surface of the bracket 36 and disposed about the aperture through which shaft end portion 18 is projected through the bracket flange 42, provides a journal for the shaft 16 at one end portion thereof. On the opposite end portion 17, a fan drive sheave 44 is rigidly secured in any conventional manner. Sheave 44 is driven by a pulley belt 45 which is operably connected in the combine power train. A conventional bearing member 46 is mounted on the outer surface of bracket 35 and serves as a journal therefor.

In FIG. 2, there is seen a fan housing shield generally designated by numeral 48. The fan housing shield 48 comprises a pair of opposed perforate side screen members 49 and 50 and a bottom fan housing screen generally designated by numeral 51. The bottom fan housing screen 51 comprises a forward imperforate guard or part 52 and an integral rearward perforated part 53.

Having reference now more particularly to the perforate side screens 49 and 50, it is seen that they are of substantially the same design, however reversed to accommodate the opposed positioning thereof. Each of the side screens 49 and 50 is of lobate configuration, having an outer flat 54 which is adapted to be disposed in a generally vertical plane spaced laterally from a respective of fan housing side walls 21 and 22, said flats 54 being disposed on the opposite sides of the combine 11. Each of the vertical flats 54 has a forward arcuate flange 55 which extends normally inwardly from its front curved edge, and each of the vertical flats 54 has a rear flange 56 which is projected normally inwardly from its opposite or rear edge, as clearly illustrated in FIG. 2. The flanges 55 and 56 are of substantially the same width and serve as spacers, the inner edges 57 thereof engaging the outer surfaces of fan housing side walls 21 and 22, respectively, in a manner such that the flats 54 of the screens 49 and 50 are substantially parallel to the respective fan housing side walls 21 and 22, each of said flats 54 being spaced from its respective fan housing side walls 21 and 22 substantially the same distance as the other thereof.

The outer surfaces of perforate side screens 49 and 50 are disposed against the inner surfaces of the fan shaft brackets 35 and 36, respectively, said perforate screens having slot-shaped openings 58 formed therein in alignment with corresponding apertures 59 in the brackets 35 and 36, as clearly illustrated in FIG. 2, to accommodate shaft end portions 17 and 18, respectively.

As illustrated in FIGS. 1 and 2, the perforate side screens 49 and 50 have lower end portions which are connected to the fan housing bottom screen 51, said screens 49 and 50 being spaced inwardly from the opposite sides of said fan housing bottom screen to provide a pair of bottom side extensions 60 projecting laterally of the combine frame 11, as clearly illustrated in FIG. 3. The fan housing bottom screen 51 is bent to approximately conform to the contour of the lower surface or bottom 61 of the fan housing 12, said screen 51 being spaced from said bottom, as illustrated in FIG. 3. In this regard, it is observed that the bottom 61 defines the under surface of the combine 11.

The imperforate guard 52 comprises the forward end portion of the bottom screen 51, said guard extending transversely of housing 12 beyond sides 21 and 22 and serving to protect the fan housing from damage as the combine on which the same is connected moves in a harvesting path. For example, in the harvesting of corn, the harvested stalks are of sufficient height to engage against the fan housing 12 to cause injury unless the same is protected.

The design of the imperforate guard 52 is such that it is adapted for connection to rigid frame parts 64 of the combine body 11. The particular design herein shown is not critical, inasmuch as it is an adaptation for a combine construction of specific design. However, to the end that the shield 48 shown in the drawings may be rigidly secured to the particular combine shown, flat-faced bosses 62, which are clearly illustrated in FIG. 2, project forwardly from the imperforate guard 52 and are adapted for rigid securance to frame parts 64 of the combine 11 by means of fasteners 63, as illustrated in FIG. 1.

The rear or perforate portion 53 of the screen 51 is bent angularly upwardly from the imperforate guard 52, following the contour of the fan housing 12. The rear perforate portion 53 has a transverse flange 65 which extends upwardly and defines the back of the shield construction 48.

By connection to a pair of braces 66, one of which is shown in each of FIGS. 1 and 2, the shield construction 48 is additionally supported by the body of the combine 11. Each of the braces 66 comprises an elongated angularly upwardly and forwardly extending arm 67, the lower end of which is fastened to a respective side of the flange 65 by means of a fastener such as a bolt and nut 68.

Each of the braces 66 is further characterized by a forwardly extending substantially horizontal upper end portion 70 which is secured by means of fasteners 72 to an upper end portion of a respective of the fan shaft brackets 35 and 36. A strap 71 is impinged between upper part 70 of each brace 66 and its respective brackets 35 and 36, each strap being secured to upper part 70 by the fasteners 72. Each strap 71 has a pair of oppositely extending end portions 73 which are substantially horizontally aligned and are secured to the outer surfaces of respective flats 54 of corresponding screens 49 and 50 as illustrated in FGS. 1 and 2, to lend support to said perforated screens 49 and 50.

The contour of the lower edge 74 of each of the perforated screens 49 and 50 corresponds to the shape of a part of the upper surface of the bottom screen 51, whereby said lower edges 74 may be abutted with the screen 51 and thereagainst secured by the heretofore defined braces 66 and a channel member 75, in a manner readily apparent by reference to FIG. 2. The channel member 75 is elongated, extending from side to side, that is, transversely of the combine body 11, and is rigidly secured, by suitable means (not shown) such as bolts and nuts or the like, to the imperforate guard 52 and to the lower end portions of the flanges 55. Thereby, perforated side screens 49 and 50 are braced from the front by the channel member 75 and from the rear by braces 66.

As clearly seen in FIG. 2, perforate side screens 49 and 50 have a pair of rectangular openings 76 in which a pair of removable doors 77 are mountable by securance of their respective lower flanges 78 to the screen extension 60 by means of suitable fasteners 79, as illustrated in FIG. 1. Having reference to the drawings, it is observed that the imperforate guard 52 of bottom screen 51 is adapted to be mounted in a substantially horizontal plane, and the perforated part 53 extends upwardly and rearwardly from the plane of the imperforate guard 52. Between the imperforate guard 52 and the perforated screen section 53, there is an integral perforate shield section 80 which lies in the plane of the imperforate guard 52 but rearwardly thereto, and from the rear edge of which perforate shield section the perforated angularly disposed part 53 projects upwardly and rearwardly, as illustrated in FIG. 2. The lower edges 74 of the side screens 49 and 50 engage the upper surface of the bottom screen 51 along the perforated section 80 and part 53, flanges 78 engaging against perforated parts 53, respectively.

In accordance with the foregoing, therefore, when the shield construction 48 is mounted in the manner illustrated in FIGS. 1 and 3, it defines a chamber limiting or having a space between said shield construction 48 and the sides 21 and 22 and the bottom 61 of fan housing 12, the character and disposition of which space has been heretofore defined and which may best be seen in FIG. 3. As combine body 11 moves in a harvesting path over vegetation, such as corn stalks 82, that is, in a direction of arrow labeled with numeral 81 in FIG. 1, the bottom 61 of fan housing 12 will be shielded from such stalks 82 first by the imperforate guard 52 and thereafter by the perforated screen section 80 and part 53 across which the vegetation will sweep. The moving force of the combine body 11 will have a tendency to break the stalks and other vegetation which passes under it, and in that sense the guard 52, which is the first part rearwardly of the crop procuring header to engage the vegetation, serves also to protect rearward parts of the combine body 11 which are not covered by shield 48, as well as fan housing 12.

In prior devices, parts corresponding to perforated side screens 49 and 50 are disposed against the opposite sides of their fan housings immediately over associated fan housing air intake openings. Once such openings become blocked by vegetation and other trash held against the screens by fan suction force, air is effectively cut off. In accordance with the instant invention, such occurrences are obviated because should the normal flow of air, which is in the direction of arrows 84 through the screens 49 and 50, be cut off by reason of clogging of the side screens 49 and 50, air flowing in the path of arrow 85, as illustrated in FIG. 3, will be drawn into the air intake openings 19 and 20 through the perforate shield section 80 and part 53, the section 80 providing a constantly clear path for the passage of air inasmuch as any material tending to accumulate on its outer surface will be swept clear by the vegetation 82 as the combine body 11 moves in a harvesting path.

In the event access to the fan housing 12 is required, it is unnecessary to dismount the entire screen construction, as entryways are provided through the opposite openings 76 heretofore described.

From the foregoing, it is apparent that high efficiency is achieved in clean grain sample procurance because of a continuous assured clean air supply for the air current impeller.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:
1. For use with a combine and the like having a body defining a fan housing, said housing having opposite air intake openings on the sides of said body, a shield-screen member adapted for mounting about said fan housing and having a bottom shield adapted for disposition below and spaced from said body, said bottom shield having a lead portion of solid fabrication and a perforate portion disposed normally rearwardly of said lead portion, and a pair of perforate screens adapted for disposition in spaced relationship to and outwardly from said air intake openings, whereupon mounting of said shield-screen member on the body the fan will be able to draw air into the fan housing through said shield and said screens.

2. For use with a combine and the like having a body defining a fan housing, said fan housing having air intake openings on opposite sides of said body and a fan including a driven shaft having opposite ends projected outwardly from said housing through said air intake openings, a shield-screen member, means on said shield-screen member for mounting thereof about the fan housing, said shield-screen member having a bottom shield adapted for disposition below and spaced from the body, said bottom shield having a lead portion of imperforate fabrication and a perforate rear portion, a pair of spaced apart foraminous screens having mounting apertures and adapted for mounting on the opposite ends of the driven shaft, said foraminous screens having lower end portions secured to said bottom shield, said shield having opposite side extensions extending outwardly from said foraminous screens and adapted to block debris sucked by the fan onto said screens.

3. For use with a combine and the like having a body disposed in generally front to rear alignment defining a fan housing, the fan housing having air intake openings disposed in alignment on opposite sides of said body, and a blower fan including a driven impeller shaft having opposite end portions projected in alignment transversely of said body outwardly through said intake openings, the improvement of a shield-screen member adapted for mounting about said fan housing and characterized by a pair of foraminous side screens having mounting apertures and adapted for mounting vertically on the opposite end portions of the shaft, said foraminous side screens having inwardly extending projections adapted to space said screens from said body, said screens having lower end portions adapted for disposition below the fan housing, a bottom shield adapted for disposition below and spaced from said body and having a forward imperforate portion and a rearward perforate portion, said bottom shield having opposite side extensions extending transversely of said body outwardly from said foraminous side screens and secured to the lower end portions thereof, and means for mounting said shield-screen on said body, whereby upon mounting of said shield-screen a passage for air into said fan housing from the sides and below said body will be provided.

4. In a combine and the like having a body adapted for disposition in generally front to rear alignment in a harvesting path, said body having a lower end portion defining a fan housing disposed during harvesting at a level lower than the vegetation over which said housing is adapted to move, said fan housing having air intake openings, a blower fan mounted in said fan housing, a screen-shield member disposed about said fan housing and defining therebetween a chamber, means for connecting said screen-shield to said body, said screen-shield having an imperforate forward housing guard portion disposed below said fan housing and a perforate rear portion, whereby vegetation in a harvesting path is precluded by said housing guard portion from engaging the housing and brushes debris from said perforate rear portion for passage therethrough of air into said air intake openings through said chamber.

5. The device defined in claim 4 in which said screen-shield is further characterized by a pair of foraminous substantially vertical side screens mounted transversely of said body and spaced outwardly from said air intake openings and having lower end portions secured to said housing guard portion providing thereby a perforate casing through which air is available for said fan from below said housing when said foraminous vertical side screens are blocked.

6. The device defined in claim 4 in which said screen-shield is further characterized by a pair of opposed parallel foraminous side members disposed transversely of said body and having chamber defining foraminous flanges spacing said parallel foraminous side members laterally from said air intake openings, said parallel foraminous side members having lower end portions secured to said housing guard portion, said perforate rear portion having an upwardly extending flange disposed transversely of said body below said fan housing and thereby providing a perforate casing for said fan housing through which air is available for said fan when said foraminous vertical side members are blocked.

7. In a combine and the like having a body adapted for disposition in front to rear alignment in a harvesting path, said body having a lower end portion defining a fan housing disposed during harvesting lower than the tops of the vegetation over which the fan housing is adapted to move, a blower fan mounted in said fan housing and including an impeller shaft having opposite end portions journalled transversely of said body, said fan housing having side air intake openings through which the end portions of said impeller shaft are projected, and a screen-shield member mounted about said fan housing and comprising a pair of side perforate screens having apertures in which the opposite end portions of said shaft are journalled, said perforate screens being substantially vertically disposed and covering said side air intake openings, respectively, said perforate screens having lower end portions extending below said fan housing and inwardly extending perforate flanges spacing said perforate screens from said side air intake openings; a bottom screen connected to the lower end portions of said perforate screens and therefrom having a pair of extensions projected outwardly, said bottom screen defined by an imperforate forward guard and a rearward foraminous section, said foraminous section having an upwardly extending flange connected to said perforate screens, said perforate screens and bottom screen providing a chamber about said fan housing into which air can be drawn from below and the sides of said body, said imperforate forward guard adapted to hold down high vegetation which will brush the foraminous section to clear therefrom drawn debris.

References Cited

UNITED STATES PATENTS

| 2,101,916 | 12/1937 | Phail | 230—128 |
| 2,849,118 | 8/1958 | Ashton | 230—128 |
| 3,213,857 | 10/1965 | Ashton et al. | 130—278 |

ANTONIO F. GUIDA, *Primary Examiner.*